US012559075B2

(12) United States Patent
Loke et al.

(10) Patent No.: US 12,559,075 B2
(45) Date of Patent: Feb. 24, 2026

(54) PRODUCTION-OPTIMIZED HOUSING FOR A HYDRAULIC UNIT FOR PRODUCING BRAKE PRESSURE FOR A HYDRAULIC BRAKE SYSTEM

(71) Applicant: Continental Teves AG & Co. OHG, Frankfurt am Main (DE)

(72) Inventors: Jörg Loke, Brechen (DE); Horst Krämer, Ginsheim-Gustavsburg (DE); Manfred Rüffer, Sulzbach (DE)

(73) Assignee: Continental Automotive Technologies GmbH, Frankfurt am Main (DE)

( * ) Notice: Subject to any disclaimer, the term of this patent is extended or adjusted under 35 U.S.C. 154(b) by 100 days.

(21) Appl. No.: 17/763,762

(22) PCT Filed: Sep. 18, 2020

(86) PCT No.: PCT/EP2020/076158
§ 371 (c)(1),
(2) Date: Mar. 25, 2022

(87) PCT Pub. No.: WO2021/058400
PCT Pub. Date: Apr. 1, 2021

(65) Prior Publication Data
US 2022/0297653 A1 Sep. 22, 2022

(30) Foreign Application Priority Data

Sep. 27, 2019 (DE) ..................... 10 2019 214 917.0

(51) Int. Cl.
*B60T 11/20* (2006.01)
(52) U.S. Cl.
CPC ........... *B60T 11/20* (2013.01); *B60Y 2304/05* (2013.01); *B60Y 2400/81* (2013.01)

(58) Field of Classification Search
CPC .. B60Y 2410/10; B60Y 2304/05; B60T 11/16
See application file for complete search history.

(56) References Cited

U.S. PATENT DOCUMENTS 5,604,969 A * 2/1997 Coop ...................... B60T 11/16
29/418
6,450,787 B1 9/2002 Risch
(Continued)

FOREIGN PATENT DOCUMENTS

CN 201493695 U 6/2010
CN 202742067 2/2013
(Continued)

OTHER PUBLICATIONS

Search Report dated Sep. 26, 2020 from corresponding German patent application No. 10 2019 214 917.0.
International Search Report and Written Opinion dated Dec. 21, 2020 from corresponding International patent application No. PCT/EP2020/076158.
Notice of Reasons for Refusal drafted Mar. 29, 2023 for the counterpart Japanese Patent Application No. 2022-510854.
Chinese Office Action dated Apr. 17, 2023 for the counterpart
(Continued)

*Primary Examiner* — Nathaniel E Wiehe
*Assistant Examiner* — Daniel S Collins

(57) ABSTRACT

A housing for a hydraulic unit, in particular a master brake cylinder for a hydraulic motor vehicle brake system, has at least a first and a second separate formed elements which are arranged on at least one side of the housing for a spatially clearly defined mounting of the housing and introduction of clamping forces into an external holding device.

13 Claims, 4 Drawing Sheets

(56) References Cited

U.S. PATENT DOCUMENTS

| | | |
|---|---|---|
| 2005/0247193 A1 | 11/2005 | Reuter et al. |
| 2006/0269393 A1 | 11/2006 | Krautzig et al. |
| 2008/0196242 A1 | 8/2008 | Bourlon et al. |

FOREIGN PATENT DOCUMENTS

| | | |
|---|---|---|
| CN | 203765340 U | 8/2014 |
| CN | 206643637 | 11/2017 |
| CN | 207241800 | 4/2018 |
| CN | 210789978 U | 6/2020 |
| DE | 4202989 A1 | 8/1993 |
| DE | 19735403 C1 | 1/1999 |
| DE | 102010019363 A1 | 11/2011 |
| EP | 1958834 A1 | 8/2008 |
| JP | S62240117 A | 10/1987 |
| JP | H07506418 A | 7/1995 |
| JP | 2013072519 A | 4/2013 |

OTHER PUBLICATIONS hinese Patent Application No. 202080059328.4.
Huang Yumei et al., "Mechanical manufacturing equipment design", 2008.
Huang Yumei et al., "Mechanical manufacturing equipment design", 2008. DeepL Translate.
Korean Office Action Jul. 26, 2023 for the counterpart Korean Patent Application No. 10-20227005224 and DeepL translation of same.
Search Report dated Apr. 15, 2024 and Preliminary office action published in Brazilian Industrial Property Journal No. 2786 on May 28, 2024 for the counterpart Brazilian Patent Application N° BR112022002575-0 and machine translation of same.
Intellectual Property India Office Action dispatched on Nov. 26, 2025 for the counterpart Indian Patent Application No. 202237007529 and machine translation of same.

\* cited by examiner

PRODUCTION-OPTIMIZED HOUSING FOR A HYDRAULIC UNIT FOR PRODUCING BRAKE PRESSURE FOR A HYDRAULIC BRAKE SYSTEM

CROSS-REFERENCE TO RELATED APPLICATIONS

This U.S. patent application claims the benefit of PCT patent application No. PCT/EP2020/076158, filed Sep. 18, 2020, which claims the benefit of German patent application No. 10 2019 214 917.0, filed Sep. 27, 2019, both of which are hereby incorporated by reference.

TECHNICAL FIELD

The invention relates to a housing for a hydraulic unit, in particular a master brake cylinder for a hydraulic motor vehicle brake system, and to the corresponding unit and the brake system.

BACKGROUND

In the production of such housings, usually firstly a blank is cast from a light metal alloy, which is then machined with material removal methods at various points. Various bores, sealing and contact faces, grooves and similar are produced which have close tolerances in themselves and relative to one another. To this end, the blank must often be clamped and repositioned repeatedly in different spatial positions in the same or even several different holding devices or workpiece carriers, and be securely fixed with interchangeable adapters and clamping devices which are individually adapted to the respective outer form of each different blank. To observe the required tolerances in the machining process, it is particularly important to ensure not only an exact and reliably reproducible spatial positioning, but also a secure and distortion-free support of high clamping forces which are necessary for receiving the loads occurring during machining. To avoid rejects, this is associated with a significant monitoring complexity during tool changes, re-clampings and position changes, and also with the need for extensive tool stocks etc., which substantially increases the production costs.

Therefore, optimizing the housing production without loss of quality, and allowing simple and reliable reproducibility is desired.

SUMMARY

The combination of features allows the implementation of an economic, standardized and robust concept with standardized and simplified workpiece holding. Faults and time loss due to incorrect workpiece holding are avoided. The result is a significant time-saving during the set-up process.

At the same time, clamping points are placed at optimized positions, which allow distortion-free use of higher clamping forces. The positioning and clamping of the housing takes place in a precise, accurately reproducible and process-reliable fashion.

BRIEF DESCRIPTION OF THE DRAWINGS

The present disclosure will become more fully understood from the detailed description and the accompanying drawings, wherein:

FIG. 1 shows a simplified general illustration of a housing in a front view (a) and side view (b).

DETAILED DESCRIPTION

Figure 2:
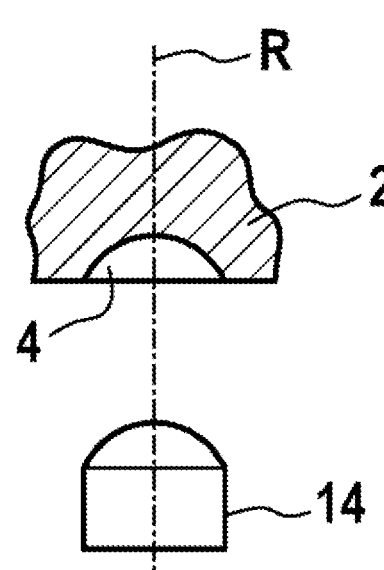
FIG. 2 shows the first formed element according to a further embodiment.

Here, for the purpose of clear and unambiguous disclosure, the physical form and position of the housing 1 are presented in relation to an axis intersection in a Cartesian coordinate system, wherein the X axis is the longitudinal axis L, the Y axis is the transverse axis Q, and the Z axis is the vertical axis H of the housing 1.

Figures 1A, 1B:
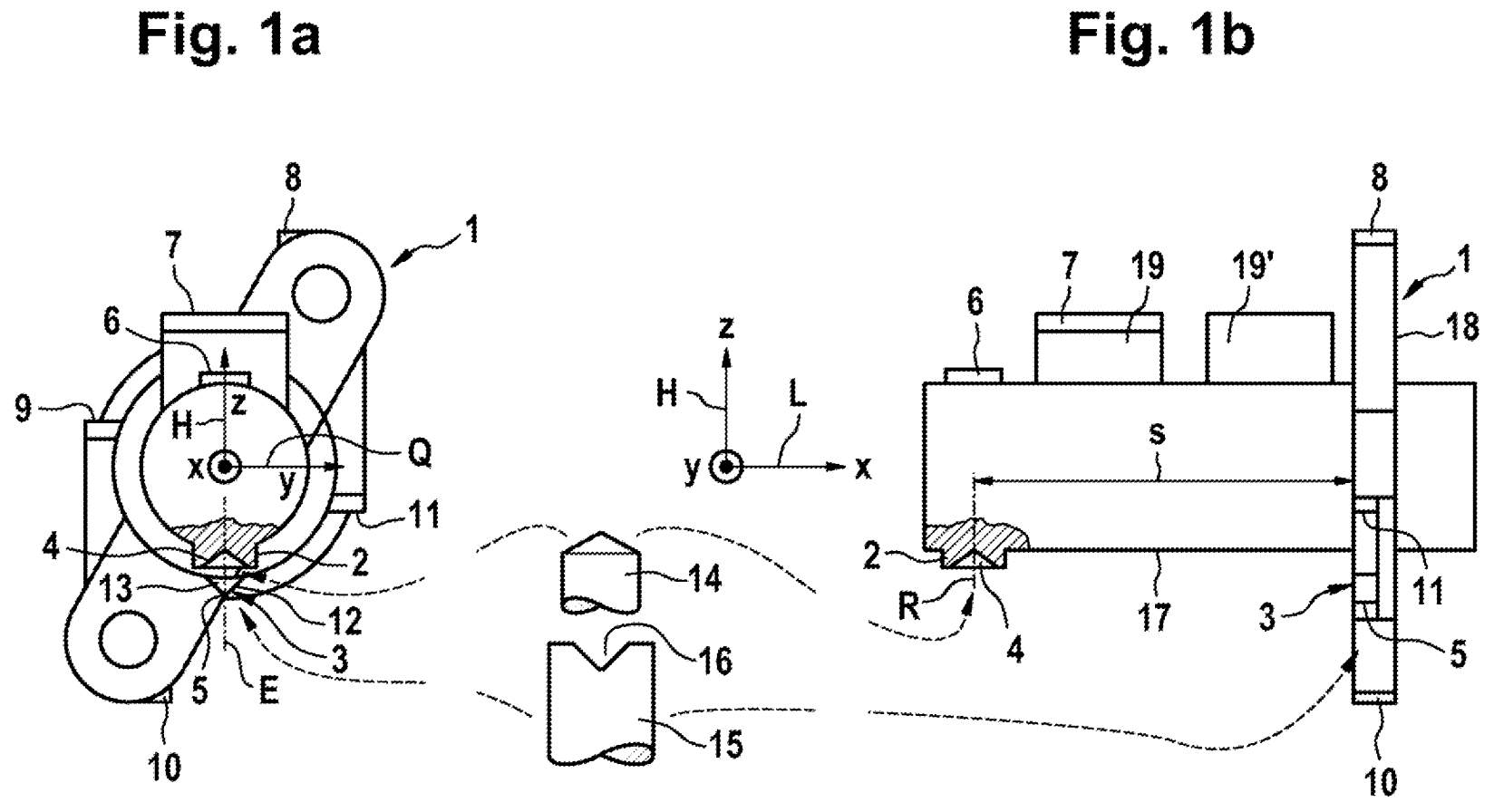

Referring to FIG. 1, in the example shown, the housing 1 of a tandem master brake cylinder for a hydraulic motor vehicle brake system is illustrated in simplified fashion.

The blank of the housing 1 of a master brake cylinder is usually produced integrally in a casting process from an aluminum alloy, then provided with the necessary surfaces, profiles and function elements by machining. For example, it has a substantially cylindrical main body extending along a longitudinal axis L, in which a blind bore must be bored for receiving pistons; a fixing flange 18 extending transversely to the longitudinal axis L, which serves for fixing the master brake cylinder to a brake force amplifier and must be turned flat; several shaped protuberances 19, 19', 19" in which receiving profiles must be bored for various connections; and further regions which are machined with a material-removal production method. To this end, the housing 1 must be positioned in a precisely defined spatial position on a holding device or workpiece carrier (not shown here), and fixed in this position.

On the bottom side of the housing 1, two separate formed elements 2, 3 are arranged which are oriented along the vertical axis H.

In the embodiment shown here, the first formed element 2 has at the end an inwardly directed, rotationally symmetrical shaping 4 forming a cavity, the rotational axis R of which is oriented substantially orthogonally to the longitudinal axis L. In the holding device, the first formed element 3 is positioned on a first contact element 14 which, for this, has a complementary conical form at the end. As well as transferring clamping forces from the housing 1 to the holding device, the centering effect of the shaping 4 can also precisely establish the neutral position of the housing 1 along the longitudinal axis L a Alternatively, the shaping 4 may be configured to be directed towards the outside, and to provide a complementary receiving cavity in the first contact element 14.

Another, second formed element 3 is arranged on the housing 1 in the region of the fixing flange 18 at a defined distance S from the first formed element 2. The second formed element 3 is here configured such that it tapers in the centrifugal direction to the longitudinal axis L, here along the vertical axis H. It has two flanks 12 and 13 oriented parallel to the longitudinal axis L and running towards one another.

In the exemplary embodiment shown, the second formed element 3 is designed wedge-shaped and mirror-symmetrically, wherein the flanks 12, 13 are flat, oriented at right angles to one another and run together at an end-side outer edge 5. The outer edge 5 thus runs parallel to the longitudinal axis L. It would also be possible to configure the flanks 12, 13 to be slightly convex or concave.

It is pointed out here that an exact parallelism is not always achievable in a blank casting for technological reasons, so that as close as possible an approximation is also tolerable.

In the holding device, the second formed element 3 is positioned in a second contact element 15, which for this has a complementary cutout 16. As well as transmitting clamping forces, the flanks 12 and 13 oriented obliquely to one another have a supporting and self-centering effect, which establishes an exactly neutral position with respect to rolling about the longitudinal axis L of the housing 1, and maintains this position during machining. Any tilt moments are effectively countered.

For an optimally symmetrical force development, the rotational axis R and the outer edge 5 may be—as shown— arranged in a common plane E which runs through the longitudinal axis L and the vertical axis H of the housing 1.

When the first formed element 2 rests on the first contact element 14, and at the same time the second formed element 3 rests on the second contact element 15, a precise, spatially defined mounting or positioning of the housing 1 in the external holding device is achieved. This positioning is also reproducible both for the same or similar blanks, and also for different blanks which are provided with identical formed elements 2, 3 arranged at the same distance S from one another.

Figure 3A:
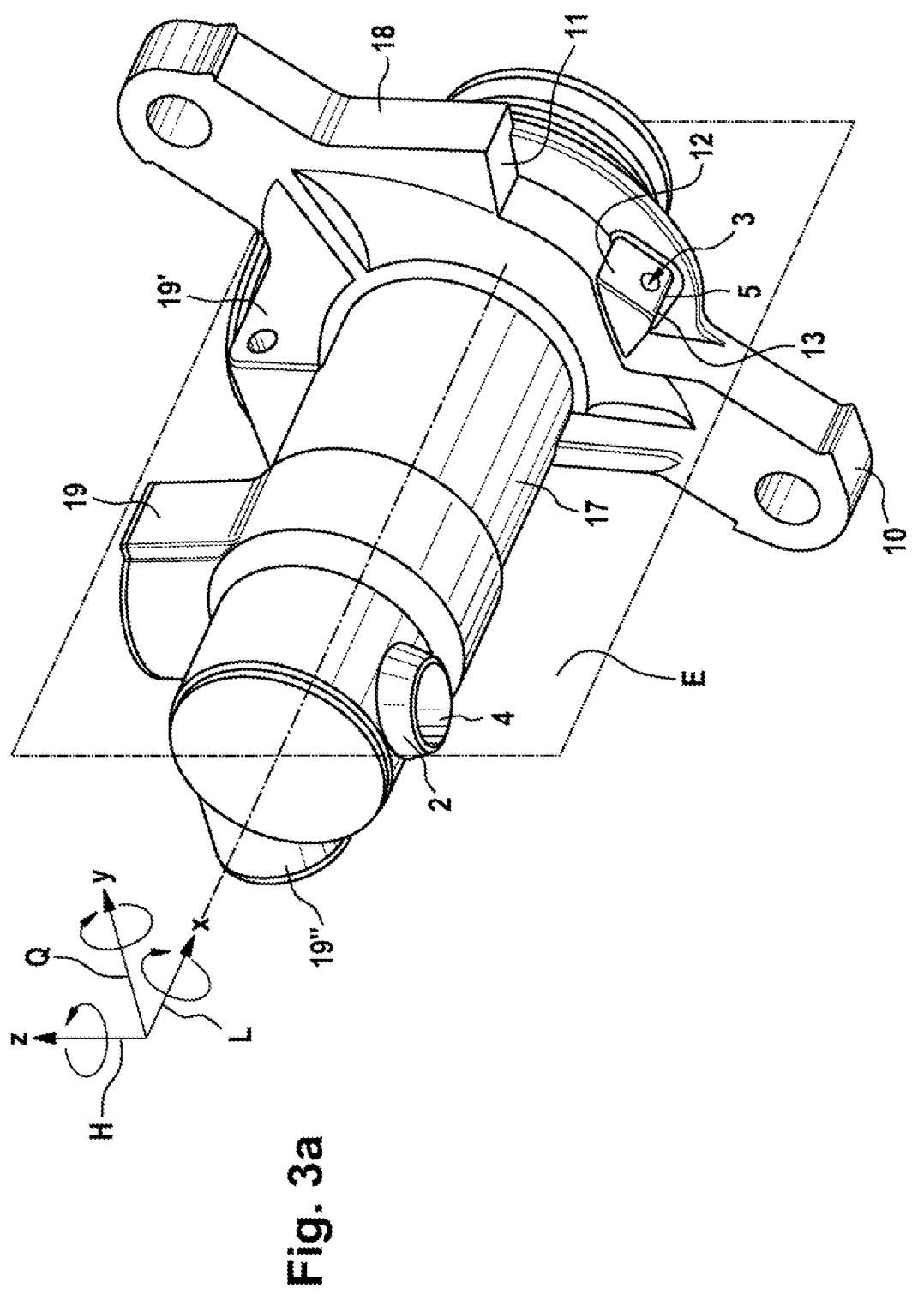
FIG. 3 shows an embodiment of the housing in various spatial views (a, b).
Figure 3B:
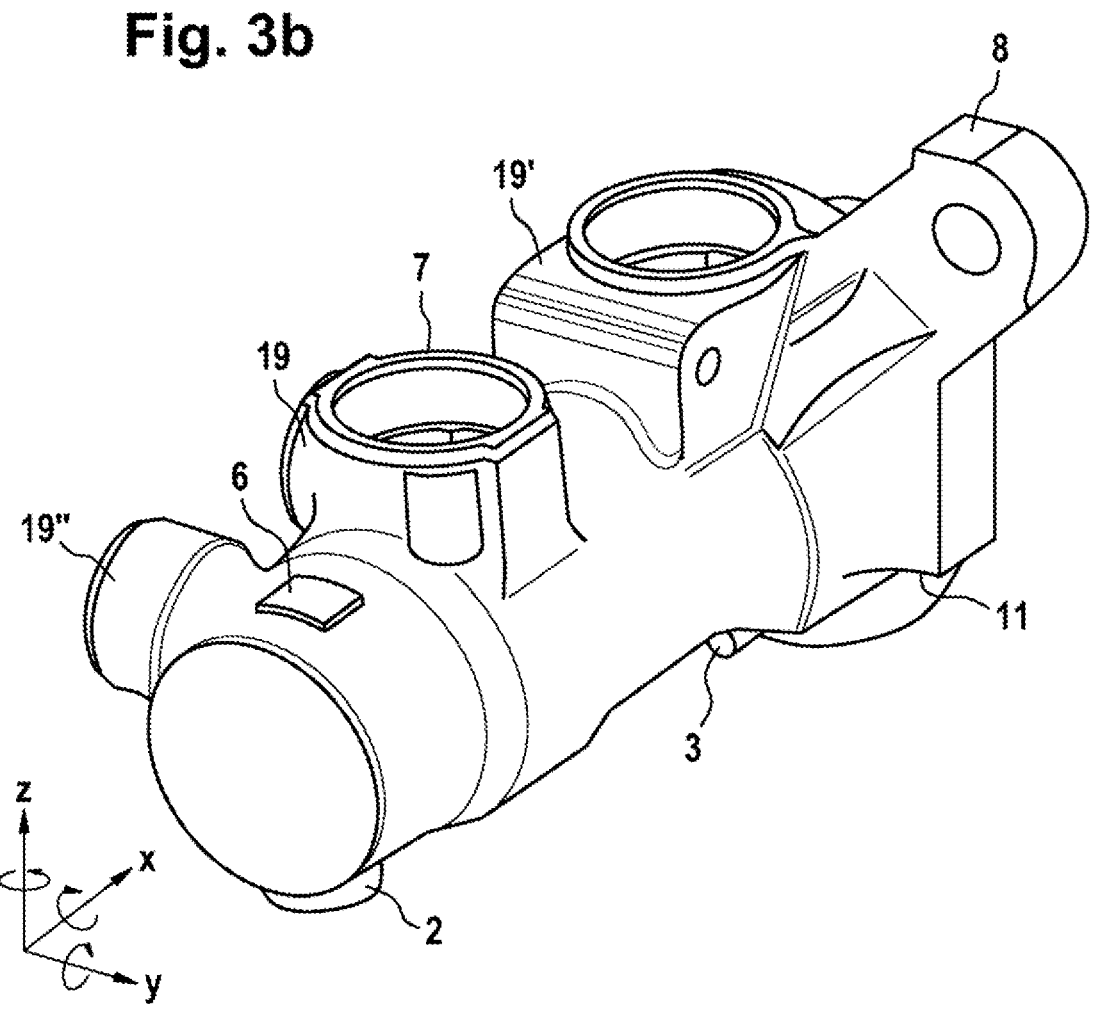

As also evident in FIG. 3, on a side of the housing 1 opposite the formed elements 2 and 3 relative to the longitudinal axis L, separate clamping faces 6, 7, 8, 9 are arranged which are oriented orthogonally to the vertical axis H. These serve for the application of clamping jaws (not shown here) for the purpose of fixing the housing 1 in the external holding device.

Separate supporting faces 10; 11 may be arranged on the opposite side of the housing 1 and parallel to the clamping faces 6; 7; 8; 9. These serve to introduce the clamping forces from the housing 1 into the external holding device.

Because the clamping face 6 and the first formed element 2 lie directly above one another, the clamping forces do not lead to a lever effect and there is no pitching moment about the transverse axis Q nor about the longitudinal axis L, and the main body 17 is not subjected to a bending load. Thus, there is no deformation of the main body 17 because of clamping forces, which could jeopardize a dimensional or angular tolerance.

A similar effect is created by the pairing of clamping face 8 with supporting face 11, and of clamping face 9 with supporting face 10, these being respectively arranged substantially above one another relative to the vertical axis H.

FIG. 2 shows as an example one of the further possible embodiments of the first formed element 2, which also allows large angular tolerances and can also absorb particularly high clamping forces. The shaping 4 has a spherical form which cooperates with a corresponding complementary, hemispherically formed first contact element 14 of the holding device.

For clarification, FIG. 3 shows a possible implementation of the invention as an example in a housing 1 of a tandem master brake cylinder of a hydraulic motor vehicle brake system, in two spatial views. The two formed elements 2 and 3 may be arranged in a common plane E which runs through the longitudinal axis L. This prevents, for example, during drilling of connecting profiles in the protuberances 19, 19', the rotational axes of which run through the same plane E, the occurrence of rolling moments about the longitudinal axis L because of the lever effect.

Figure 4:
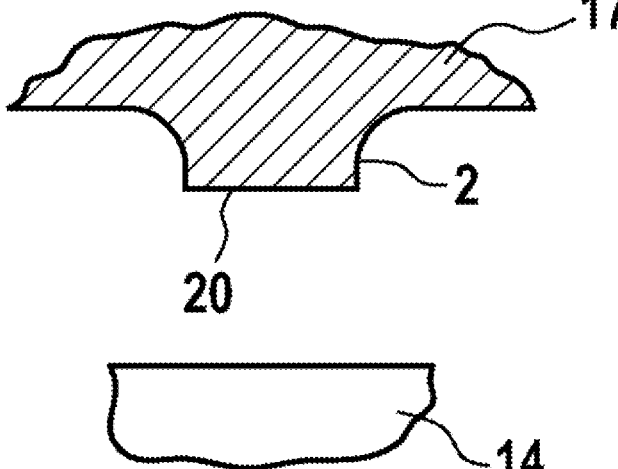
FIG. 4 shows the first formed element according to another embodiment.

According to another embodiment shown in FIG. 4, the first formed element 2 is produced as a block and on the end, instead of a shaping, has a flat supporting face 20 which may be suitable for introducing high clamping forces into the corresponding first contact element 14 of the holding device, these forces being introduced into the housing 1 via the parallel clamping face 6.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A housing for a hydraulic unit for producing brake pressure for a hydraulic brake system, comprising:
    at least one elongated portion along a longitudinal axis of the housing and configured for machining in at least one region;
    at least a first formed element and a second formed element formed on a blank of the housing during the casting process arranged on at least one side of the housing wherein the first formed element and the second formed element are specifically intended to receive clamping forces during a machining process;
    wherein the first formed element has a rotationally symmetrical shape to define a neutral position along the longitudinal axis of the housing, wherein a rotational axis of the first formed element is directed orthogonally to the longitudinal axis;
    wherein the second formed element has a wedge-shape and tapers in a radial outward direction relative to the longitudinal axis and has two flanks which are oriented parallel to the longitudinal axis and run towards one another to establish a neutral position with respect to rolling about the longitudinal axis of the housing;
    a spatial transverse axis, a spatial vertical axis and the longitudinal axis, are defined such that they form an axis intersection of a Cartesian coordinate system;
    at least one separate clamping face formed during the casting process parallel to a plane oriented orthogonally to the vertical axis, the clamping face wherein the at least one separate clamping face is on a second side of the housing, opposite the at least first and second formed elements and relative to the longitudinal axis; and
    a plurality of machining regions, wherein the first formed element, the second formed element and the at least one separate clamping surface are unmachined surfaces separate from the plurality of machining regions.

2. The housing as claimed in claim 1, wherein on a side of the housing opposite the clamping face relative to the longitudinal axis, at least one separate supporting face is formed which is oriented parallel to the clamping face and is provided for the introduction of clamping forces.

3. The housing as claimed in claim 1, wherein an end face of the first formed element comprises a flat supporting face for the introduction of clamping forces.

4. The housing as claimed in claim 1, wherein the rotational axis and an outer edge of the first formed element are arranged in a common plane which runs through the longitudinal axis and the vertical axis of the housing.

5. The housing as claimed in claim 1, wherein the wedge-shaped second formed element has an outer edge which is oriented axially parallel to the longitudinal axis.

6. The housing as claimed in claim 1, wherein the hydraulic unit is a master brake cylinder for a hydraulic brake system.

7. The housing as claimed in claim 1, wherein the housing is for a hydraulic unit.

8. The housing as claimed in claim 1, wherein the housing is for a hydraulic unit of a hydraulic motor vehicle brake system.

9. The housing as claimed in claim 1, wherein the at least a first formed element and at least one clamping face are centered on a same plane of the vertical axis.

10. The housing as claimed in claim 1, wherein the at least a first formed element and at least one clamping face are separate from all of the at least one region for machining.

11. The housing as claimed in claim 1, wherein the first formed element, second formed element and the at least one separate clamping surface receives the clamping forces during the entire machining process.

12. The housing as claimed in claim 1, wherein the entire machining process is performed without re-clamping the housing.

13. The housing as claimed in claim 1, wherein housing is distortion free while under the clamping force.

\*  \*  \*  \*  \*